US010273949B2

(12) United States Patent
Takahashi (10) Patent No.: US 10,273,949 B2
(45) Date of Patent: Apr. 30, 2019

(54) CRYOPUMP AND METHOD OF OPERATING THE CRYOPUMP

(71) Applicant: Sumitomo Heavy Industries, Ltd., Tokyo (JP)

(72) Inventor: Kakeru Takahashi, Tokyo (JP)

(73) Assignee: SUMITOMO HEAVY INDUSTRIES, LTD., Tokyo (JP)

(*) Notice: Subject to any disclaimer, the term of this patent is extended or adjusted under 35 U.S.C. 154(b) by 19 days.

(21) Appl. No.: 15/422,878

(22) Filed: Feb. 2, 2017

(65) Prior Publication Data

US 2017/0145998 A1 May 25, 2017

Related U.S. Application Data

(62) Division of application No. 14/182,778, filed on Feb. 18, 2014.

(30) Foreign Application Priority Data

Feb. 18, 2013 (JP) .................................. 2013-028723

(51) Int. Cl.
| F04B 37/08 | (2006.01) |
| B01D 8/00 | (2006.01) |
| F04C 18/02 | (2006.01) |
| F25B 9/14 | (2006.01) |

(52) U.S. Cl.
CPC .............. *F04B 37/08* (2013.01); *B01D 8/00* (2013.01); *F04B 37/085* (2013.01); *F04C 18/0215* (2013.01); *F25B 9/14* (2013.01)

(58) Field of Classification Search
CPC .......... F04B 37/08; F04B 37/085; B01D 8/00; Y10S 417/901; F25B 9/10; F25B 9/14; F25B 9/145
See application file for complete search history.

(56) References Cited

U.S. PATENT DOCUMENTS

| 4,614,093 | A | * | 9/1986 | Bachler | F04B 37/08 |
| | | | | | 417/901 |
| 5,001,903 | A | * | 3/1991 | Lessard | F04B 37/08 |
| | | | | | 417/901 |
| 5,386,708 | A | * | 2/1995 | Kishorenath | F04B 37/08 |
| | | | | | 417/901 |
| 5,582,017 | A | * | 12/1996 | Noji | F04B 37/08 |
| | | | | | 417/901 |
| 6,460,351 | B2 | * | 10/2002 | Gaudet | F04B 37/08 |
| | | | | | 417/901 |

(Continued)

FOREIGN PATENT DOCUMENTS

| JP | S62-203981 A | 9/1987 |
| JP | H03-237275 A | 10/1991 |

(Continued)

*Primary Examiner* — Keith Raymond
(74) *Attorney, Agent, or Firm* — Michael Best & Friedrich LLP (57) ABSTRACT

A method of operating a cryopump includes: cooling a cryopanel from an initial temperature higher than a cryogenic temperature for a vacuum pumping operation to the cryogenic temperature by using a refrigerator; and after the cooling, initiating the vacuum pumping operation, in which the cooling includes providing a cooling relief effect selectively to a high-temperature stage of the refrigerator.

8 Claims, 7 Drawing Sheets

(56) References Cited

U.S. PATENT DOCUMENTS

2011/0162391 A1* 7/2011 Ball-DiFazio .......... F04B 37/08
62/55.5
2011/0162959 A1* 7/2011 Okada .................... F04B 37/08
204/192.1

FOREIGN PATENT DOCUMENTS

| JP | H05-057375 U | 7/1993 |
| JP | H09-317640 A | 12/1997 |
| JP | 2000-161214 A | 6/2000 |
| JP | 2012-219730 A | 11/2012 |

* cited by examiner

CRYOPUMP AND METHOD OF OPERATING THE CRYOPUMP

CROSS-REFERENCE TO RELATED APPLICATION

This is a divisional of U.S. patent application Ser. No. 14/182,778 filed on Feb. 18, 2014, claiming priority to Japanese Patent Application No. 2013-028723 filed on Feb. 18, 2013, the contents of which are incorporated herein by reference in their entirety.

BACKGROUND

Technical Field

The present invention relates to a cryopump and a method of operating the cryopump.

Description of Related Art

When a new cryopump is installed on site, the cryopump is cooled from a room temperature to a cryogenic temperature and a vacuum pumping operation is initiated. Further, the cryopump is a gas entrapment vacuum pump, as known, and hence regeneration is performed at a certain interval in order to discharge entrapped gas to the outside. Regeneration processing generally includes a temperature-raising step, a discharge step, and a cooling step. When the cooling step is terminated, the vacuum pumping operation of the cryopump is resumed. The cooling of the cryopump, performed as preparation for such a vacuum pumping operation, may be sometimes referred to as cool-down.

Although the cryopump is one of the major applications of a cryogenic refrigerator, it is different from other applications in that a relatively large temperature difference is required between a high-temperature stage and a low-temperature stage of the refrigerator. However, when the cryopump is cooled, it is not easy to create such a temperature difference in a short period of time. For example, if the temperature of the low-temperature stage does not yet reach its target temperature when the temperature of the high-temperature stage reaches its target cooling temperature, the cooling of the low-temperature stage is required to be still continued, while the high-temperature stage is being maintained at the target temperature. Alternatively, the high-temperature stage can already be cooled to a temperature lower than the target temperature, when the temperature of the low-temperature stage reaches the target temperature. In this case, the temperature of the high-temperature stage is required to be raised to the target temperature. Such temperature adjustment in the end of the cool-down takes a certain period of time. In particular, when a large temperature difference is required between the high-temperature stage and the low-temperature stage, the temperature adjustment takes a long period of time. Since the cool-down is a downtime of the cryopump, it is desirable to carry out the cool down in a short period of time.

SUMMARY

An exemplary object according to an aspect of the present invention, it is desirable to shorten a cooling time of a cryopump and to provide a method of operating such a cryopump.

According to an embodiment of the present invention, a cryopump having a high-temperature cryopanel, a low-temperature cryopanel, and a cooling system is provided. The cooling system includes: a refrigerator provided with a high-temperature stage for cooling the high-temperature cryopanel and a low-temperature stage for cooling the low-temperature cryopanel; and a control unit configured to control a cool-down operation in which the high-temperature stage and the low-temperature stage are cooled in order to initiate a vacuum pumping operation of the cryopump. The cooling system is configured to provide a cooling relief effect selectively to the high-temperature stage at least temporarily in the cool-down operation.

According to an embodiment of the present invention, a method of operating a cryopump is provided. The method includes: cooling a cryopanel from an initial temperature higher than a cryogenic temperature for a vacuum pumping operation to the cryogenic temperature by using a refrigerator; and after the cooling, initiating the vacuum pumping operation, in which the cooling includes providing a cooling relief effect selectively to a high-temperature stage of the refrigerator.

It is noted that any combination of the aforementioned components or any manifestation of certain embodiments of the present invention exchanged between methods, devices, systems and so forth, is effective as an embodiment of the present invention.

BRIEF DESCRIPTION OF THE DRAWINGS

Embodiments will now be described, by way of example only, with reference to the accompanying drawings, which are meant to be exemplary, not limiting, and wherein like elements are numbered alike in several figures, in which.

DETAILED DESCRIPTION

The invention will now be described by reference to the preferred embodiments. This does not intend to limit the scope of the present invention, but to exemplify the invention.

According to an embodiment of the present invention, a cooling relief effect (i.e., an effect that reduces a cooling capability) is selectively provided to a high-temperature stage during a cool-down operation while the cooling of a low-temperature stage continues at the normal level. This enables a larger difference in temperature to be generated rapidly between the high-temperature stage and the low-temperature stage. Accordingly, a temperature deviation of the low-temperature stage (or of the high-temperature stage) from its target temperature when the high-temperature stage (or the low-temperature stage) is finally cooled to its target temperature can be reduced. Therefore, a period of time required for the temperature adjustment in the end of cool-down can be shortened. As a result, a cool-down time of a cryopump can be shortened.

Figure 1:
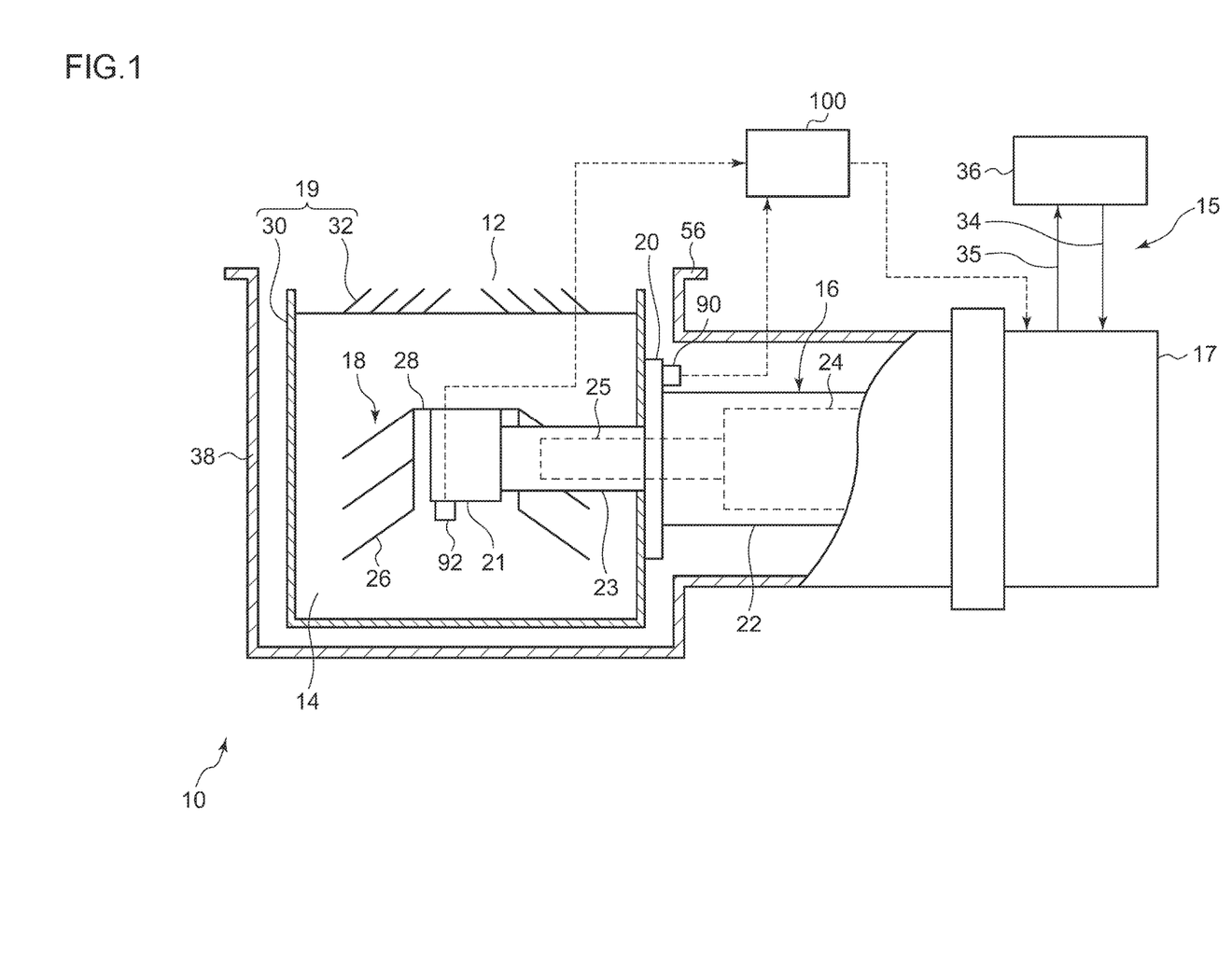
FIG. 1 is a schematic view illustrating a cryopump according to an embodiment of the present invention.

FIG. 1 is a schematic view illustrating a cryopump 10 according to an embodiment of the present invention. The cryopump 10, which is mounted, for example, to a vacuum chamber such as an ion implantation apparatus or a sputtering apparatus, is used to raise the degree of vacuum inside the vacuum chamber to a level required of a desired process.

The cryopump 10 has an inlet 12 for receiving a gas. The inlet 12 is an entrance to an internal space 14 of the cryopump 10. A gas to be pumped enters the internal space 14 of the cryopump 10 through the inlet 12 from the vacuum chamber to which the cryopump 10 is mounted.

It is to be noted that the terms "axial direction" and "radial direction" may be used in the following description to clearly show the positional relationships between the constituent parts of the cryopump 10. The axial direction represents a direction passing through the inlet 12, whereas the radial direction represents a direction along the inlet 12. For convenience, with respect to the axial direction, positions relatively closer to the inlet 12 may be described as "above", and positions relatively farther from the inlet 12 as "below". That is, positions relatively farther from the bottom of the cryopump 10 may be described as "above", and positions relatively closer thereto as "below". With respect to the radial direction, positions closer to the center of the inlet 12 may be described as "inside", and positions closer to the periphery of the inlet 12 as "outside". However, it is to be noted that these descriptions do not limit the locations of the cryopump 10 as mounted to the vacuum chamber. For example, the cryopump 10 may be mounted to the vacuum chamber with the inlet 12 facing downward in the vertical direction.

The cryopump 10 includes a cooling system 15, a low-temperature cryopanel 18, and a high-temperature cryopanel 19. The cooling system 15 is configured to cool the high-temperature cryopanel 19 and the low-temperature cryopanel 18. The cooling system 15 also includes a refrigerator 16 and a compressor 36.

The refrigerator 16 is a cryogenic refrigerator, such as, for example, a Gifford-McMahon refrigerator (so-called GM refrigerator). The refrigerator 16 is a two-stage type refrigerator including a first stage 20, a second stage 21, a first cylinder 22, a second cylinder 23, a first displacer 24, and a second displacer 25. Accordingly, the high-temperature stage of the refrigerator 16 includes the first stage 20, the first cylinder 22, and the first displacer 24. The low-temperature stage of the refrigerator 16 includes the second stage 21, the second cylinder 23, and the second displacer 25. Accordingly, in the following description, the first stage 20 and the second stage 21 can also be referred to as a low-temperature end of the high-temperature stage and that of the low-temperature stage, respectively.

The first cylinder 22 and the second cylinder 23 are connected in series. The first stage 20 is installed in a joint portion between the first cylinder 22 and the second cylinder 23. The second cylinder 23 connects the first stage 20 and the second stage 21. The second stage 21 is installed at the end of the second cylinder 23. The first displacer 24 and the second displacer 25 are arranged inside the first cylinder 22 and the second cylinder 23, respectively, so as to be movable in the longitudinal direction of the refrigerator 16 (the horizontal direction in FIG. 1). The first displacer 24 and the second displacer 25 are connected together so as to be movable integrally. A first regenerator and a second regenerator (not illustrated) are installed within the first displacer 24 and the second displacer 25, respectively.

The refrigerator 16 includes a drive mechanism 17 provided at the high-temperature end of the first cylinder 22.

The drive mechanism 17 is connected to the first displacer 24 and the second displacer 25 such that the first displacer 24 and the second displacer 25 can be moved in a reciprocal manner inside the first cylinder 22 and the second cylinder 23, respectively. The drive mechanism 17 includes a flow channel switching mechanism that switches the flow channels of an operating gas such that intake and discharge of the gas are periodically repeated. The flow channel switching mechanism includes, for example, a valve unit and a drive unit for driving the valve unit. The valve unit includes, for example, a rotary valve, and the drive unit includes a motor for rotating the rotary valve. The motor may be, for example, an AC motor or a DC motor. The flow channel switching mechanism may be a mechanism of a direct acting type that is driven by a linear motor.

The refrigerator 16 is connected to the compressor 36 via a high-pressure conduit 34 and a low-pressure conduit 35. The refrigerator 16 generates cold on the first stage 20 and the second stage 21 by expanding, in the inside thereof, the high-pressure operating gas (e.g., helium) supplied from the compressor 36. The compressor 36 recovers the operating gas that has been expanded in the refrigerator 16, and increase the pressure thereof again to supply to the refrigerator 16.

Specifically, the drive mechanism 17 first communicates the high-pressure conduit 34 with the internal space of the refrigerator 16. The high-pressure operating gas is supplied from the compressor 36 to the refrigerator 16 through the high-pressure conduit 34. When the internal space of the refrigerator 16 is filled with the high-pressure operating gas, the drive mechanism 17 switches the flow channel so as to communicate the internal space of the refrigerator 16 with the low-pressure conduit 35. Thereby, the operating gas is expanded. The expanded operating gas is recovered into the compressor 36. In synchronization with such supply and discharge of the operating gas, the first displacer 24 and the second displacer 25 move in a reciprocal manner inside the first cylinder 22 and the second cylinder 23, respectively. The refrigerator 16 generates cold on the first stage 20 and the second stage 21 by repeating such heat cycles.

The refrigerator 16 is configured to cool the first stage 20 to a first temperature level and the second stage 21 to a second temperature level. The second temperature level is lower than the first temperature level. For example, the first stage 20 is cooled to approximately 65 K to 120 K, and preferably to 80 K to 100 K, whereas the second stage 21 is cooled to approximately 10 K to 20 K.

The refrigerator 16 is configured to flow the operating gas to the low-temperature stage through the high-temperature stage. That is, the operating gas flowing in from the compressor 36 flows into the second cylinder 23 from the first cylinder 22. At this time, the operating gas is cooled to the temperature of the first stage 20 (i.e., the low-temperature end of the high-temperature stage) by the first displacer 24 and its regenerator. The operating gas thus cooled is supplied to the low-temperature stage. Accordingly, it is expected that the temperature of the operating gas introduced into the high-temperature stage of the refrigerator 16 from the compressor 36 may not significantly affect the cooling capability of the low-temperature stage.

The refrigerator 16 may be a three-stage type refrigerator in which three cylinders are connected in series, or a multi-stage type refrigerator having more than three cylinders. The refrigerator 16 may be a refrigerator other than the GM refrigerator, such as a pulse tube refrigerator or a Solvay refrigerator.

FIG. 1 illustrates a section including both of the central axis of the internal space 14 of the cryopump 10 and the central axis of the refrigerator 16. The cryopump 10 illustrated therein is a so-called horizontal cryopump. The horizontal cryopump generally means a cryopump in which the refrigerator 16 is so arranged as to intersect (normally intersect perpendicularly) with the central axis of the internal space 14 of the cryopump 10. Similarly, the present invention is applicable also to a so-called vertical cryopump. The vertical cryopump means a cryopump in which a refrigerator is arranged along the axial direction of the cryopump.

The low-temperature cryopanel 18 is provided in the central portion of the internal space 14 of the cryopump 10. The low-temperature cryopanel 18 includes, for example, a plurality of panel members 26. Each of the panel members 26 has, for example, the shape of a side surface of a truncated cone, so to speak, an umbrella-like shape. An adsorbent (not illustrated), such as activated carbon, is normally provided in each panel member 26. The adsorbent is, for example, adhered to the rear surface of the panel member 26. Thus, the low-temperature cryopanel 18 includes an adsorption region for adsorbing gas molecules.

The panel members 26 are mounted to a panel mounting member 28. The panel mounting member 28 is mounted to the second stage 21. Thus, the low-temperature cryopanel 18 is thermally connected to the second stage 21. Accordingly, the low-temperature cryopanel 18 is cooled to the second temperature level.

The high-temperature cryopanel 19 includes a radiation shield 30 and an inlet cryopanel 32. The high-temperature cryopanel 19 is provided outside the low-temperature cryopanel 18 so as to surround the low-temperature cryopanel 18. The high-temperature cryopanel 19 is thermally connected to the first stage 20, and accordingly the high-temperature cryopanel 19 is cooled to the first temperature level.

The radiation shield 30 is provided mainly for protecting the low-temperature cryopanel 18 from the radiant heat from a housing 38 of the cryopump 10. The radiation shield 30 is located between the housing 38 and the low-temperature cryopanel 18 and encloses the low-temperature cryopanel 18. The axial upper end of the radiation shield 30 is opened toward the inlet 12. The radiation shield 30 has a tubular shape (e.g., cylindrical shape) whose axial lower end is closed, and is formed into a cup-like shape. A hole for mounting the refrigerator 16 is provided in a side surface of the radiation shield 30, and the second stage 21 is inserted into the radiation shield 30 therefrom. The first stage 20 is fixed, at the outer circumferential portion of the mounting hole, to the external surface of the radiation shield 30. Thus, the radiation shield 30 is thermally connected to the first stage 20.

The inlet cryopanel 32 is provided axially above the low-temperature cryopanel 18, and is arranged along the radial direction in the inlet 12. The inlet cryopanel 32 is fixed, at the outer circumferential portion thereof, to the open end of the radiation shield 30, and is thermally connected to the radiation shield 30. The inlet cryopanel 32 is formed, for example, into a louver structure or a chevron structure. The inlet cryopanel 32 may be formed into a concentric circle shape whose center is on the central axis of the radiation shield 30, or into another shape, such as a lattice-like shape.

The inlet cryopanel 32 is provided for pumping a gas entering the inlet 12. A gas that condenses at the temperature of the inlet cryopanel 32 (e.g., moisture) is captured on the surface of the inlet cryopanel 32. The inlet cryopanel 32 is provided also for protecting the low-temperature cryopanel 18 from the radiation heat from a heat source outside the cryopump 10 (e.g., a heat source inside the vacuum chamber to which the cryopump 10 is mounted). The inlet cryopanel 32 also restricts the entry of not only the radiation heat but also gas molecules. The inlet cryopanel 32 occupies part of the opening area of the inlet 12, thereby limiting the entry of a gas into the internal space 14 through the inlet 12 to a desired amount.

The cryopump 10 is provided with the housing 38. The housing 38 is a vacuum container separating the inside of the cryopump 10 from the outside. The housing 38 is configured to airtightly hold the pressure in the internal space 14 of the cryopump 10. The housing 38 maintains the high-temperature cryopanel 19 and the refrigerator 16 therewithin. The housing 38, which is provided outside the high-temperature cryopanel 19, encloses the high-temperature cryopanel 19. Also, the housing 38 has the refrigerator 16 therewithin. In other words, the housing 38 is a cryopump container enclosing the high-temperature cryopanel 19 and the low-temperature cryopanel 18.

The housing 38 is fixed to a portion having the ambient temperature (e.g., a high-temperature part of the refrigerator 16) in such a manner that the housing 38 does not touch the high-temperature cryopanel 19 and a low-temperature part of the refrigerator 16. The external surface of the housing 38, which is exposed to the outside environment, has a temperature higher than that of the cooled high-temperature cryopanel 19 (e.g., approximately room temperature).

The housing 38 also has an inlet flange 56 extending radially outward from the opening end thereof. The inlet flange 56 serves as a flange by which the cryopump 10 is mounted to the vacuum chamber. A gate valve (not illustrated) is provided at the opening of the vacuum chamber, and the inlet flange 56 is mounted to the gate valve. Thus, the gate valve is located axially above the inlet cryopanel 32. For example, the gate valve is closed when the cryopump 10 is regenerated, and is opened when the vacuum chamber is evacuated by the cryopump 10.

The cryopump 10 includes a first temperature sensor 90 for measuring the temperature of the first stage 20 and a second temperature sensor 92 for measuring the temperature of the second stage 21. The first temperature sensor 90 is mounted to the first stage 20. The second temperature sensor 92 is mounted to the second stage 21. Alternatively, the first temperature sensor 90 may be mounted to the high-temperature cryopanel 19. The second temperature sensor 92 may be mounted to the low-temperature cryopanel 18.

The cryopump 10 includes a control unit 100. The control unit 100 may be provided integrally with the cryopump 10 or may be configured as a separate controller away from the cryopump 10.

The control unit 100 is configured to control the refrigerator 16 to carry out a vacuum pumping operation, a regeneration operation, and a cool-down operation of the cryopump 10. The control unit 100 is configured to receive measurement results of various sensors including the first temperature sensor 90 and the second temperature sensor 92. Based on such measurement results, the control unit 100 generates an instruction for control to be provided to the refrigerator 16.

The control unit 100 controls the refrigerator 16 such that the stage temperature follows a target cooling temperature. The target temperature of the first stage 20 is usually set to a fixed value. The target temperature of the first stage 20 is defined as a specification in accordance with the process performed in the vacuum chamber to which the cryopump 10 is mounted. Alternatively, the target temperature may be changed, if necessary, during the operation of the cryopump.

For example, the control unit 100 controls the operating frequency of the refrigerator 16 by feedback control, so that a deviation between the target temperature of the first stage 20 and a measured temperature of the first temperature sensor 90 is minimized. That is, the control unit 100 controls the number of heat cycles per unit time, i.e., a heat cycle frequency in the refrigerator 16 by controlling the number of revolutions of the motor in the drive mechanism 17.

When a heat load to the cryopump 10 is increased, the temperature of the first stage 20 maybe raised. When the measured temperature of the first temperature sensor 90 is higher than the target temperature, the control unit 100 increases the operating frequency of the refrigerator 16. As a result, the heat cycle frequency in the refrigerator 16 is also increased, thereby allowing the first stage 20 to be cooled toward the target temperature. Conversely, when the measured temperature of the first temperature sensor 90 is lower than the target temperature, the operating frequency of the refrigerator 16 is reduced, thereby allowing the temperature of the first stage 20 to be raised toward the target temperature. Thus, the temperature of the first stage 20 can be retained within a range of temperatures close to the target temperature. Because the operating frequency of the refrigerator 16 can be appropriately adjusted in accordance with a heat load, such control is useful for reducing the power consumption of the cryopump 10.

In the following description, the control of the refrigerator 16, by which the temperature of the first stage 20 is made substantially equal to the target temperature, may be referred to as "first stage temperature control". While the cryopump 10 is performing the vacuum pumping operation, the first stage temperature control is usually executed. As a result of the first stage temperature control, the second stage 21 and the low-temperature cryopanel 18 are cooled to a temperature determined by the specification of the refrigerator 16 and a heat load from the outside. Similarly, the control unit 100 can also execute, so to speak, "second stage temperature control" in which the refrigerator 16 is controlled such that the temperature of the second stage 21 is made substantially equal to the target temperature.

Figure 2:
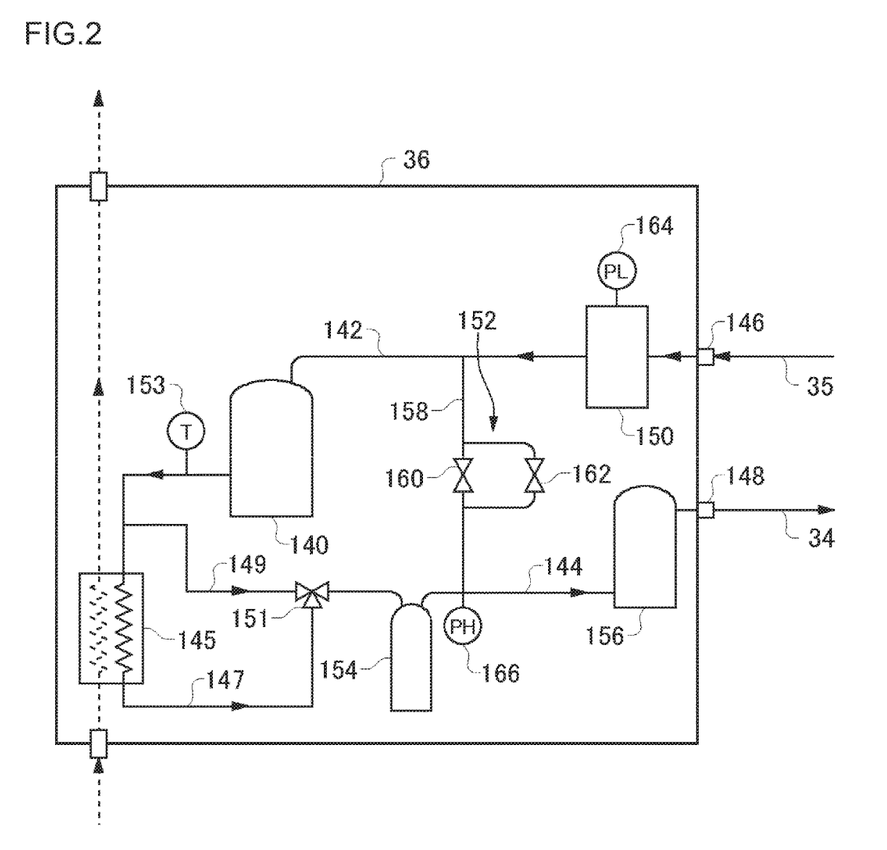
FIG. 2 is a schematic view illustrating a compressor according to an embodiment of the invention.

FIG. 2 is a schematic view illustrating the compressor 36 according to an embodiment of the present invention. The compressor 36 is provided for circulating the operating gas through a closed fluid circuit including the cryopump 10. The compressor 36 recovers the operating gas from the cryopump 10, and compresses it to deliver to the cryopump 10 again. The compressor 36 includes a compressor main body 140 for raising the pressure of a gas, a low-pressure pipe 142 for supplying a low-pressure gas supplied from the outside to the compressor main body 140, and a high-pressure pipe 144 for delivering a high-pressure gas compressed by the compressor main body 140 to the outside.

The compressor 36 receives, at a return port 146, a return gas from the cryopump 10. The operating gas is sent to the low-pressure pipe 142 from the return port 146. The return port 146 is provided, at the end of the low-pressure pipe 142, on the housing of the compressor 36. The low-pressure pipe 142 connects the return port 146 and an intake port of the compressor main body 140.

The low-pressure pipe 142 includes, at its middle, a storage tank 150 as a volume for eliminating pulsation included in the returned gas. The storage tank 150 is provided between the return port 146 and a branch to a bypass mechanism 152, which will be described later. The operating gas, in which pulsation has been eliminated in the storage tank 150, is supplied to the compressor main body 140 through the low-pressure pipe 142. Inside the storage tank 150, a filter for removing unnecessary particles, etc., from a gas maybe provided. Between the storage tank 150 and the return port 146, a receiving port and a pipe that are provided for replenishing an operating gas from the outside may be connected.

The compressor main body 140 is, for example, a scroll pump or a rotary pump, and performs a function of raising the pressure of the gas taken in. The compressor main body 140 sends out the operating gas, the pressure of which has been raised, to the high-pressure pipe 144. The compressor main body 140 is configured to be cooled with oil, and an oil cooling pipe that circulates oil is provided in association with the compressor main body 140. Thereby, the operating gas, the pressure of which has been raised, is sent out to the high-pressure pipe 144 in a state in which the oil is a little mixed therein.

Therefore, at the middle of the high-pressure pipe 144, an oil separator 154 is provided. Oil separated from the operating gas by the oil separator 154 may be returned to the low-pressure pipe 142, and may be returned to the compressor main body 140 through the low-pressure pipe 142. A relief valve for releasing an excessive high-pressure may be provided in the oil separator 154.

At the middle of the high-pressure pipe 144 that connects the compressor main body 140 and the oil separator 154, a heat exchanger 145 for cooling the high-pressure operating gas delivered from the compressor main body 140 is provided. The heat exchanger 145 cools the operating gas by, for example, cooling water (indicated by the dashed line). The cooling water may also be used for cooling the oil that cools the compressor main body 140. On at least one side of the upstream and the downstream of the heat exchanger in the high-pressure pipe 144, a temperature sensor 153 for measuring the temperature of the operating gas may be provided.

Two pathways are provided in order to connect the compressor main body 140 and the oil separator 154. That is, a main flow channel 147 passing through the heat exchanger 145 and a bypass channel 149 bypassing the heat exchanger 145 are provided. The bypass channel 149 is branched from the main flow channel 147 on the upstream side of the heat exchanger 145 (on the downstream side of the compressor main body 140), and is converged into the main flow channel 147 on the downstream side of the heat exchanger 145 (on the upstream side of the oil separator 154).

A three-way valve 151 is provided at a position where the main flow channel 147 and the bypass channel 149 are converged together. By switching the three-way valve 151, the flow channel of the operating gas can be switched to one of the main flow channel 147 and the bypass channel 149. The three-way valve 151 may be replaced by another equivalent flow channel configuration. The main flow channel 147 and the bypass channel 149 may be switched to each other by providing, for example, a two-port valve in each of the two channels.

The operating gas that has passed through the oil separator 154 is sent to an adsorber 156 through the high-pressure pipe 144. The adsorber 156 is provided for removing, from the operating gas, contaminants that have not been removed by a contaminant removing means provided in a flow passage, such as, for example, the filter in the storage tank 150, the oil separator 154, or the like. The adsorber 156 removes, for example, evaporated oil by adsorption.

A supply port 148 is provided on the housing of the compressor 36 at the end of the high-pressure pipe 144. That is, the high-pressure pipe 144 connects the compressor main body 140 and the supply port 148, and at the middle thereof, the heat exchanger 145, the oil separator 154 and the adsorber 156 are provided. The operating gas that has passed through the adsorber 156 is delivered to the cryopump 10 through the supply port 148.

The compressor 36 comprises the bypass mechanism 152 having a bypass pipe 158 that connects the low-pressure pipe 142 and the high-pressure pipe 144. In the illustrated embodiment, the bypass pipe 158 is branched from the low-pressure pipe 142 at a location between the storage tank 150 and the compressor main body 140. Further, the bypass pipe 158 is branched from the high-pressure pipe 144 at a location between the oil separator 154 and the adsorber 156.

The bypass mechanism 152 includes a control valve for controlling the flow rate of the operating gas that is not delivered to the cryopump 10 and bypasses from the high-pressure pipe 144 to the low-pressure pipe 142. In the illustrated embodiment, a first control valve 160 and a second control valve 162 are provided in parallel at the middle of the bypass pipe 158. In one embodiment, the first control valve 160 is a normally-opened type solenoid valve, and the second control valve 162 is a normally-closed type solenoid valve. The first control valve 160 is provided for equalizing the pressures on the high-pressure side and the low-pressure side after the operation is stopped, and the second control valve 162 is used as a flow control valve in the bypass pipe 158.

The compressor 36 includes a first pressure sensor 164 for measuring the pressure of the return gas from the cryopump 10 and a second pressure sensor 166 for measuring the pressure of the supply gas to the cryopump 10. The first pressure sensor 164 is installed, for example, in the storage tank 150 so as to measure the pressure of the return gas in which pulsation has been eliminated in the storage tank 150. The second pressure sensor 166 is provided, for example, between the oil separator 154 and the adsorber 156.

Figure 3:
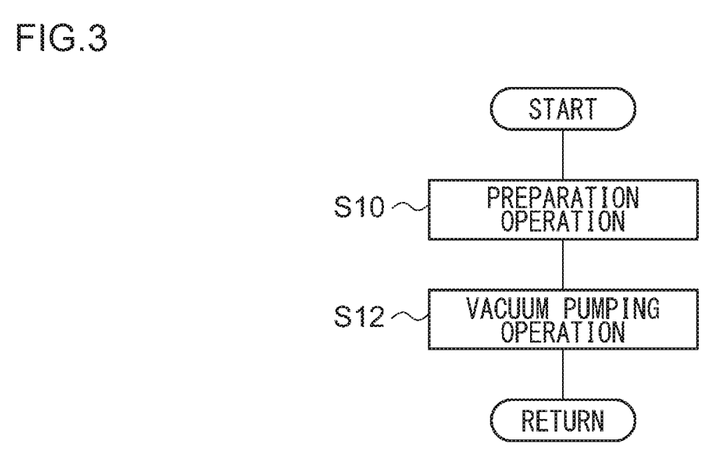
FIG. 3 is a flowchart for describing a method of operating a cryopump according to an embodiment.

FIG. 3 is a flowchart for describing a method of operating the cryopump 10 according to an embodiment of the present invention. This operation method includes a preparation operation (S10) and a vacuum pumping operation (S12). The vacuum pumping operation is a normal operation of the cryopump 10. The preparation operation includes any operation states to be executed ahead of the normal operation. The control unit 100 timely repeats and executes this operation method. When the vacuum pumping operation is terminated and the preparation operation is initiated, a gate valve between the cryopump 10 and the vacuum chamber is normally closed.

The preparation operation (S10) is performed for activating, for example, the cryopump 10. The activation of the cryopump 10 includes cool-down in which the cryopanels 32 and 34 are cooled from the environmental temperature in which the cryopump 10 is installed (e.g., room temperature) to cryogenic temperatures. The target cooling temperatures of the cool-down are standard operating temperatures set for the vacuum pumping operation. As described above, the standard operating temperature of the high-temperature cryopanel 19 is selected, for example, from a range of approximately 80 K to 100 K, whereas that of the low-temperature cryopanel 18 is from a range of approximately 10 K to 20 K. The preparation operation (S10) may also include rough pumping the inside of the cryopump 10 to the operation initiation pressure (e.g., approximately 1 Pa) by using a rough pumping valve (not illustrated), etc.

The preparation operation (S10) may be a regeneration operation of the cryopump 10. The regeneration operation is executed for the preparation of a next vacuum pumping operation after the current vacuum pumping operation is terminated. The regeneration is so-called full regeneration in which both of the low-temperature cryopanel 18 and the high-temperature cryopanel 19 are regenerated, or partial regeneration in which only the low-temperature cryopanel 18 is regenerated.

The regeneration includes a temperature-raising step, a discharge step, and a cooling step. The temperature-raising step includes raising the temperature of the cryopump 10 to a regeneration temperature higher than the aforementioned standard operating temperature. In the case of the full regeneration, the regeneration temperature is, for example, room temperature or a temperature a little higher than that (e.g., approximately 290 K to 300 K). A heat source for the temperature-raising step is, for example, the reverse temperature rise of the refrigerator 16, and/or heaters 40 and 42 (see FIG. 7) attached to the refrigerator 16.

The discharge step includes discharging gases re-evaporated from the surfaces of the cryopanels to the outside of the cryopump 10. The re-evaporated gases are discharged from the cryopump 10 along with a purge gas introduced if necessary. The operation of the refrigerator 16 is stopped in the discharge step. The cooling step includes re-cooling the low-temperature cryopanel 18 and the high-temperature cryopanel 19 in order to resume the vacuum pumping operation. An operation state of the refrigerator 16 in the cooling step is the same as that in the cool-down for the activation. In the cooling step, however, the initial temperature of each of the cryopanels is in a room-temperature level in the case of the full regeneration, whereas that is in the middle between room temperature and the aforementioned standard operating temperature (e.g., 100 K to 200 K) in the case of the partial regeneration.

As illustrated in FIG. 3, the vacuum pumping operation (S12) is performed following the preparation operation (S10). When the preparation operation is terminated and the vacuum pumping operation is initiated, the gate valve between the cryopump 10 and the vacuum chamber is opened.

In the vacuum pumping operation (S12), gas molecules flying from the vacuum chamber toward the cryopump 10 are captured on the surfaces of the cryopanels cooled to the cryogenic temperatures by condensation or adsorption. A gas (e.g., moisture, etc.), the vapor pressure of which is sufficiently low at the cooling temperature of the high-temperature cryopanel 19 (e.g., inlet cryopanel 32), is condensed on the high-temperature cryopanel 19. A gas, the vapor pressure of which is not sufficiently low at the cooling temperature of the inlet cryopanel 32, enters the radiation shield 30 after passing through the inlet cryopanel 32. A gas (e.g., argon, etc.), the vapor pressure of which is sufficiently low at the cooling temperature of the low-temperature cryopanel 18, is condensed on the low-temperature cryopanel 18. A gas (e.g., hydrogen, etc.), the vapor pressure of which is not sufficiently low even at the cooling temperature of the low-temperature cryopanel 18, is adsorbed by the adsorbent in the low-temperature cryopanel 18. Thus, the cryopump 10 can make the degree of vacuum in the vacuum chamber to reach a desired level.

The vacuum pumping operation is a steady operation state in which the standard operating temperatures are maintained. On the other hand, the period of time of the preparation operation corresponds to a downtime of the cryopump 10 (i.e., a down period of the vacuum pumping operation), and hence it is desirable that the period of time is short as much as possible. Accordingly, the refrigerator 16 is required to have a higher refrigeration capability in the preparation operation than that in the normal operation. In most cases, the refrigerator 16 is operated at a considerably high operating frequency (e.g., the highest operating frequency allowed or a cycle close thereto) in the preparation operation.

Figure 4:
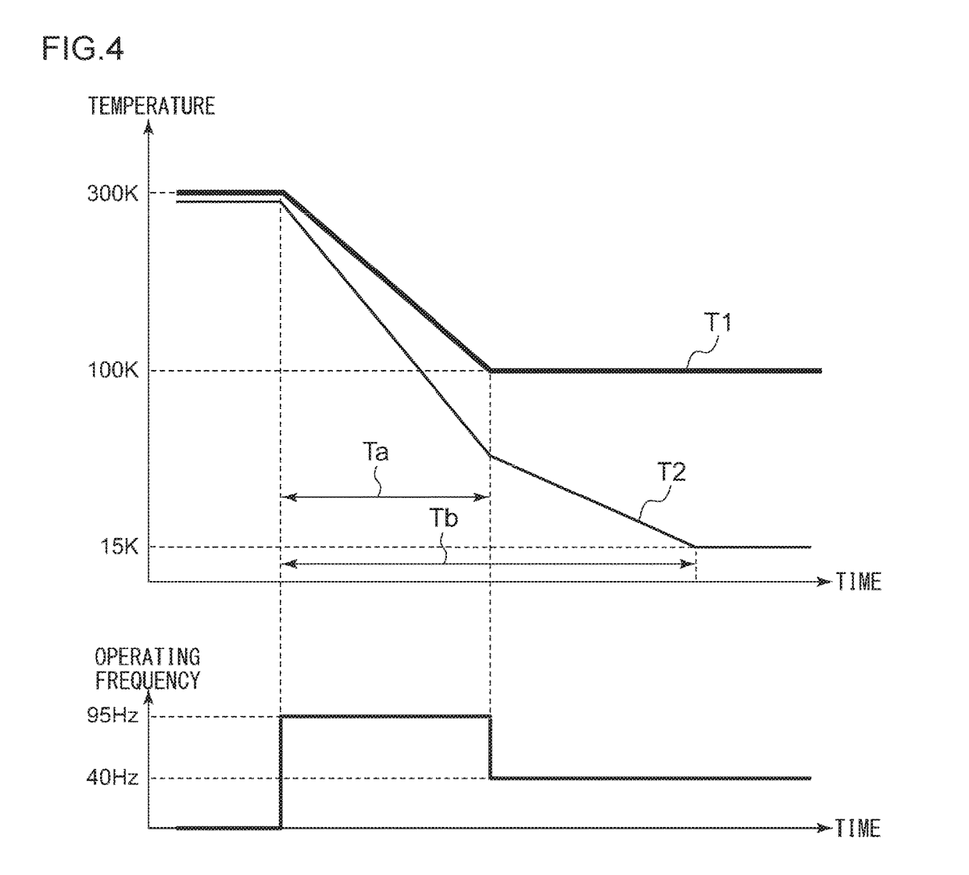
FIG. 4 is a view illustrating an example of a temperature profile in a typical cool-down operation.

FIG. 4 is a view illustrating an example of a temperature profile in a typical cool-down operation. The vertical axis and horizontal axis in FIG. 4 represent temperature and time, respectively. FIG. 4 schematically illustrates changes over time with respect to the temperature T1 of the first stage 20 and the temperature T2 of the second stage 21. Both initial values of the temperature T1 of the first stage 20 and the temperature T2 of the second stage 21 at the start of the cool-down are, for example, 300 K, and the target cooling temperatures of the first stage 20 and the second stage 21 are, for example, 100 K and 15K, respectively. Also, an example of an operating frequency profile of the refrigerator 16 is illustrated in a lower portion in FIG. 4.

In the cool-down operation illustrated in FIG. 4, the refrigerator 16 is operated at full power until the temperature T1 of the first stage 20 reaches the target temperature 100 K. At this time, the operating frequency of the refrigerator 16 is fixed to the maximum in an allowable range (e.g., operating frequency of 95 Hz). Thereby, the first stage 20 is promptly cooled toward the target temperature 100 K. The temperature T1 of the first stage 20 then reaches the target temperature 100 K in a period of time Ta from the start of the cool-down operation. At this time, the refrigerator 16 is switched to the aforementioned first stage temperature control from the full power operation. Subsequently, the temperature T1 of the first stage 20 is maintained at the target temperature 100 K. The operating frequency of the refrigerator 16 is drastically reduced, for example, to approximately 40 Hz by being switched to the first stage temperature control.

The second stage 21 is cooled by the full power operation of the refrigerator 16, similarly to the first stage 20. Because the cooling rate of the second stage 21 is slightly larger than that of the first stage 20, the second stage 21 is cooled to a temperature slightly lower than the temperature T1 of the first stage 20 (e.g., approximately 80 K), when the temperature T1 reaches the target temperature 100 K. At this time, however, the temperature of the second stage 21 is still far higher than the target temperature 15 K. After the refrigerator 16 is switched to the first stage temperature control from the full power operation, the second stage 21 is slowly cooled toward the target temperature 15 K. The temperature T2 of the second stage 21 then reaches the target temperature 15 K in a period of time Tb from the start of the cool-down operation. At this time, both temperatures of the first stage 20 and the second stage 21 reach the target cooling temperatures, respectively, and the cool-down is terminated.

Thus, the cool-down operation may include both an initial cooling phase, in which the high-temperature stage and the low-temperature stage of the refrigerator 16 are cooled toward the respective target temperatures, and a temperature adjustment phase subsequent to the initial cooling phase in which the temperatures of the high-temperature stage and the low-temperature stage of the refrigerator 16 are adjusted to the respective target temperatures. The refrigerator 16 may be operated with a relatively high operating frequency during the initial cooling phase, and operated with a relatively low operating frequency during the temperature adjustment phase. Accordingly, the initial cooling phase may be high-power cool-down (or a rapid cooling stage), and the temperature adjustment phase may be low-power cool-down (or a slow cooling stage).

As described above, the control of the cool-down operation is executed by the control unit 100 based on the measured temperatures of the first temperature sensor 90 and the second temperature sensor 92. The control unit 100 may execute the initial cooling phase from the beginning of the cool-down until the temperature of the low-temperature end of the high-temperature stage reaches the target temperature or a determination threshold temperature close to the target temperature. When the initial cooling phase is terminated, the temperature of the low-temperature end of the low-temperature stage maybe higher than the target temperature. The control unit 100 may initiate the temperature adjustment phase at the termination of the initial cooling phase. The control unit 100 may execute the temperature adjustment phase such that the temperature of the low-temperature end of the high-temperature stage is maintained at the target temperature and the temperature of the low-temperature end of the low-temperature stage is lowered to the target temperature. The control unit 100 may execute the temperature adjustment phase until the temperature of the low-temperature end of the low-temperature stage reaches the target temperature or a determination threshold temperature close to the target temperature.

The completion of the cooling of the low-temperature stage may be delayed from that of the high-temperature stage, as above-described, when the mass of the low-temperature cryopanel 18 is large, for example. As a panel is heavier, it is more time-consuming to cool the panel. In the cryopumps designed such that most of gas to be pumped is a non-condensable gas (e.g., hydrogen), there is a tendency that the mass of the low-temperature cryopanel 18 becomes large. Accordingly, the cryopump 10 according to the present embodiment is particularly suitable for a cryopump designed such that most of gas to be pumped is hydrogen gas.

In another embodiment, the control unit 100 may execute the initial cooling phase from the beginning of the cool-down until the temperature of the low-temperature end of the low-temperature stage reaches the target temperature or a determination threshold temperature close to the target temperature. When the initial cooling phase is terminated, the temperature of the low-temperature end of the high-temperature stage maybe lower than the target temperature. The control unit 100 may initiate the temperature adjustment phase at the termination of the initial cooling phase. The control unit 100 may execute the temperature adjustment phase such that the temperature of the low-temperature end of the low-temperature stage is maintained at the target temperature and the temperature of the low-temperature end of the high-temperature stage is raised to the target temperature. The control unit 100 may execute the temperature adjustment phase until the temperature of the low-temperature end of the high-temperature stage reaches the target temperature or a determination threshold temperature close to the target temperature.

In the present embodiment, the cooling system 15 is configured to selectively provide a cooling relief effect to the high-temperature stage of the refrigerator 16 at least temporarily in the cool-down operation. For example, the cooling system 15 reduces only the cooling capability of the high-temperature stage, independently of the control of the heat cycle frequency in the refrigerator 16. Accordingly, the cooling system 15 is configured to supply the operating gas, the temperature of which is higher than that in the vacuum pumping operation, to the high-temperature stage of the refrigerator 16 at least temporarily in the cool-down operation.

The cooling system 15 raises the temperature of the operating gas to be supplied to the refrigerator 16 by flow channel switching control in the compressor 36. The control unit 100 switches the flow channels of the operating gas in the compressor 36, in accordance with an operation state of the refrigerator 16. The control unit 100 switches the flow channels such that: when the refrigerator 16 is not in the cool-down operation (e.g., when performing the normal vacuum pumping operation), the operating gas flows through the main flow channel 147 passing through the heat exchanger 145; and when the refrigerator 16 is in the cool-down operation, the operating gas flows through the bypass channel 149.

Figure 5:
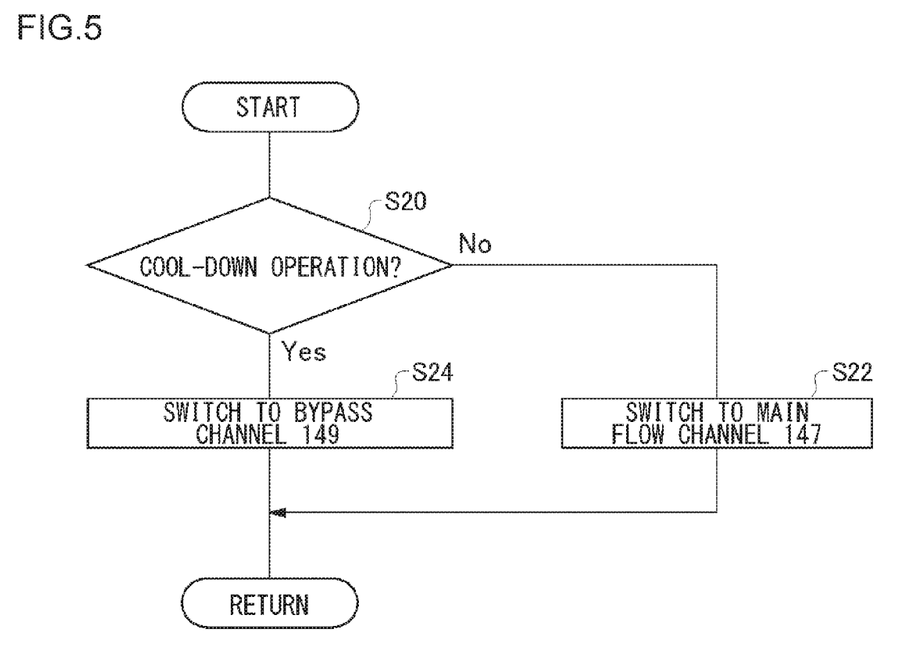
FIG. 5 is a flowchart for describing flow channel switching control in a compressor according to an embodiment of the invention.

FIG. 5 is a flowchart for describing the flow channel switching control in the compressor 36 according to an embodiment of the present invention. This processing is repeated at a predetermined cycle by the control unit 100. The control unit 100 first determines an operation state of the refrigerator 16 (S20). When the refrigerator 16 is not in the cool-down operation (S20/No), the control unit 100 switches the three-way valve 151 such that the operating gas passes through the main flow channel 147 in the compressor 36 (S22). When the refrigerator 16 is not in the cool-down operation continuously from the last determination, the state in which the operating gas passes through the main flow channel 147 is maintained.

On the other hand, when the refrigerator 16 is in the cool-down operation (S20/Yes), the control unit 100 switches the three-way valve 151 such that the operating gas passes through the bypass channel 149 in the compressor 36 (S24). When the refrigerator 16 is in the cool-down operation continuously from the last determination, the state in which the operating gas passes through the bypass channel 149 is maintained.

In an embodiment, the control unit 100 may make the operating gas pass through the bypass channel 149 in the compressor 36 only in the initial cooling phase of the cool-down operation. Alternatively, the control unit 100 may make the operating gas pass through the bypass channel 149 until the cool-down operation is completed. The control unit 100 switches the three-way valve 151 such that the pathway for the operating gas is returned to the main flow channel 147 by the time when the vacuum pumping operation is initiated.

By such operations of switching the three-way valve 151, the operating gas passes through the main flow channel 147, i.e., the heat exchanger 145 during the vacuum pumping operation, whereas the operating gas passes through the bypass channel 149, without passing through the heat exchanger 145, during the cool-down operation. Accordingly, the low-temperature operating gas is cooled by the heat exchanger 145 to supply to the refrigerator 16 in the vacuum pumping operation. On the other hand, the operating gas does not pass through the heat exchanger 145 in the cool-down operation, and hence the high-temperature operating gas, provided with heat of compression in the compressor main body 140, is directly supplied to the refrigerator 16.

Figure 6:
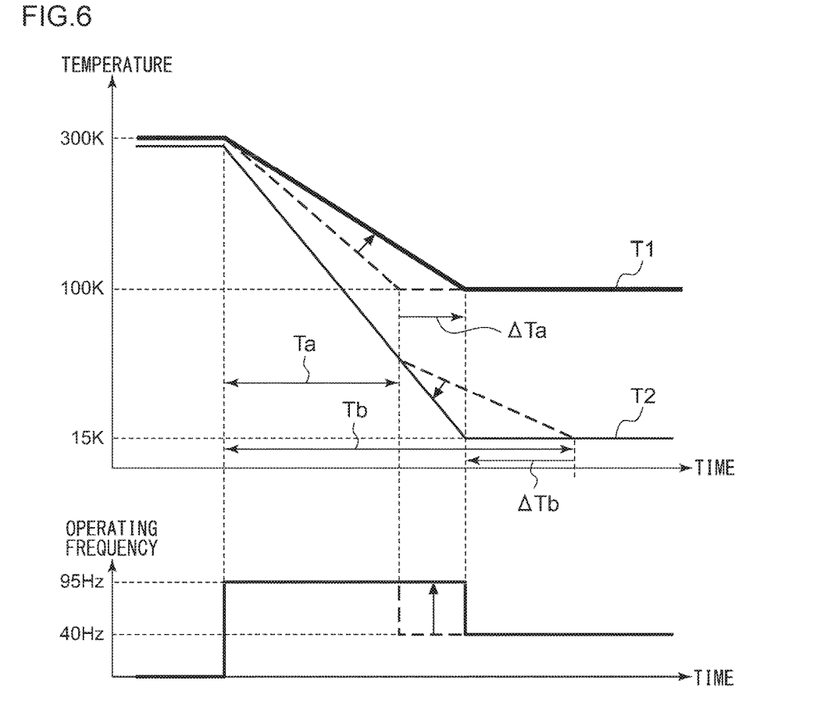
FIG. 6 is a view illustrating an example of a temperature profile in a cool-down operation according to an embodiment of the invention.

FIG. 6 is a view illustrating an example of a temperature profile in the cool-down operation according to an embodiment of the present invention. In this cool-down operation, the high-temperature operating gas is supplied to the refrigerator 16 continuously from the initiation to the termination of the cool-down operation by the flow channel switching control in the compressor 36. The vertical axis and horizontal axis in FIG. 6 represent temperature and time, respectively, similarly to FIG. 4. Both initial values of the temperature T1 of the first stage 20 and the temperature T2 of the second stage 21 at the start of the cool-down are, for example, 300 K, and the target cooling temperatures of the first stage 20 and the second stage 21 are, for example, 100 K and 15 K, respectively. For comparison, FIG. 6 illustrates the temperature profile as shown in FIG. 4 by the dashed lines. Also, an example of an operating frequency profile of the refrigerator 16 is illustrated in a lower portion in FIG. 6. Similarly, FIG. 6 illustrates the operating frequency profile as shown in FIG. 4 by the dashed line for comparison.

In the cool-down operation illustrated in FIG. 6, the refrigerator 16 is operated at full power until the temperature T1 of the first stage 20 reaches the target temperature 100 K. At this time, the operating frequency of the refrigerator 16 is fixed to the maximum in an allowable range (e.g., operating frequency of 95 Hz). Thereby, the first stage 20 is promptly cooled toward the target temperature 100 K.

However, because the high-temperature operating gas is supplied to the refrigerator 16, the cooling capability of the high-temperature stage is reduced. Accordingly, the temperature lowering rate of the first stage 20 is also reduced (a temperature gradient becomes small, as illustrated). Thus, the temperature T1 of the first stage 20 reaches the target temperature 100 K in a period of time Ta+ΔTa from the initiation of the cool-down operation. At this time, the refrigerator 16 is switched to the aforementioned first stage temperature control from the full power operation. Subsequently, the temperature T1 of the first stage 20 is maintained at the target temperature 100 K. The operating frequency of the refrigerator 16 is drastically reduced, for example, to approximately 40 Hz by being switched to the first stage temperature control. Thus, the supply of the high-temperature operating gas to the refrigerator 16 extends the initial cooling phase by only the time ΔTa.

On the other hand, the temperature lowering rate of the second stage 21 in the initial cooling phase is not reduced, as illustrated in FIG. 6. This is because it can be considered that, as described above, the cooling relief effect in the present embodiment does not affect the cooling capability of the low-temperature stage of the refrigerator 16. In other words, the temperature difference of the operating gas between the cool-down operation and the vacuum pumping operation is set not to affect the cooling capability of the low-temperature stage of the refrigerator 16.

Accordingly, the temperature difference between the first stage 20 and the second stage 21 is rapidly expanded. Therefore, as illustrated in FIG. 6, the temperature difference generated at the point of time after the time Ta passes from the initiation of the cool-down operation becomes larger in comparison with that in the typical cool-down illustrated in FIG. 4. Further, the temperature lowering rate of the second stage 21 during the time ΔTa becomes large with the switch to the first stage temperature control being delayed by the time ΔTa due to the cooling relief effect provided to the high-temperature stage. Thus, the temperature T2 of the second stage 21, occurring when the temperature T1 of the first stage 20 reaches the target temperature 100 K, can be more lowered.

In the temperature profile illustrated in FIG. 6, the temperature T2 of the second stage 21 reaches the target temperature 15 K in a period of time Tb−ΔTb from the initiation of the cool-down operation. In this example, the cool-down operation is adjusted such that, when the temperature T1 of the first stage 20 reaches the target temperature 100 K, the temperature T2 of the second stage 21 also reaches the target temperature 15 K. Both temperatures of the first stage 20 and the second stage 21 simultaneously reach the target cooling temperatures, respectively, and the cool-down is terminated. In the example illustrated in FIG. 6, the cool-down operation time is shortened by the time ΔTb, in comparison with the typical case illustrated in FIG. 4.

According to the present embodiment, the cool-down time can be shortened by supplying the relatively high-temperature operating gas to the refrigerator 16 during the cool-down operation. Accordingly, the downtime (e.g., regeneration time) of the cryopump can be shortened.

As a direct way of enhancing the cooling capability of a refrigerator in order to shorten a cool-down time, it can also be considered to use a refrigerator having a large volume, and/or to use a large difference in pressure between the recovery side and the supply side of a compressor. In such methods, however, the refrigerator and/or the compressor are required to be significantly modified in design, and hence the price of a product can be increased. According to the present embodiment, a cool-down time can be advantageously shortened without such significant design modification being required.

In the aforementioned embodiment, the high-temperature operating gas is continuously supplied to the refrigerator 16 during the cool-down operation. However, the cooling system 15 may be configured to selectively provide the cooling relief effect to the high-temperature stage of the refrigerator 16 temporarily or intermittently in the cool-down operation. Even with such a configuration, it is clear that a similar effect of shortening the cool-down time can be acquired.

Accordingly, the cooling system 15 may be configured to provide the cooling relief effect to the high-temperature stage of the refrigerator 16, for example, at least during the initial cooling phase. In this case, a state, in which the operating frequency of the refrigerator 16 is high, can be continued or extended by lengthening the initial cooling phase. Alternatively, the cooling system 15 maybe configured to provide the cooling relief effect to the high-temperature stage of the refrigerator 16 at least during the temperature adjustment phase. In this case, the operating frequency of the refrigerator 16 becomes high so as to cancel the cooling relief effect to the high-temperature stage. As a result, the cooling capability of the low-temperature stage can be enhanced.

In the aforementioned embodiment, the cool-down operation is adjusted such that, when the temperature T1 of the first stage 20 reaches the target temperature, the temperature T2 of the second stage 21 also reaches the target temperature. However, similarly to the typical case illustrated in FIG. 4, the cool-down operation may be adjusted such that, when the temperature T1 of the first stage 20 reaches the target temperature, the temperature T2 of the second stage 21 reaches a temperature higher than the target temperature. Alternatively, the cool-down operation may be adjusted such that, when the temperature T1 of the first stage 20 reaches the target temperature, the temperature T2 of the second stage 21 reaches a temperature lower than the target temperature.

In the aforementioned embodiment, the refrigerator 16 is operated at full power in the beginning of the cool-down operation, and subsequently the operation of the refrigerator 16 is switched to the first stage temperature control. However, the control unit 100 may execute the first stage temperature control from the beginning of the cool-down operation. In this case, as the temperature of the first stage 20 is lowered, the operation state of the refrigerator 16 is smoothly changed from the high-power cool-down to the low-power cool-down. Alternatively, the control unit 100 may execute the second stage temperature control in the cool-down operation. For example, the control unit 100 may execute the second stage temperature control in the initial cooling phase of the cool-down operation, and when the second stage 21 is cooled to a temperature close to the target temperature, the control unit 100 may switch to the first stage temperature control.

Figure 7:
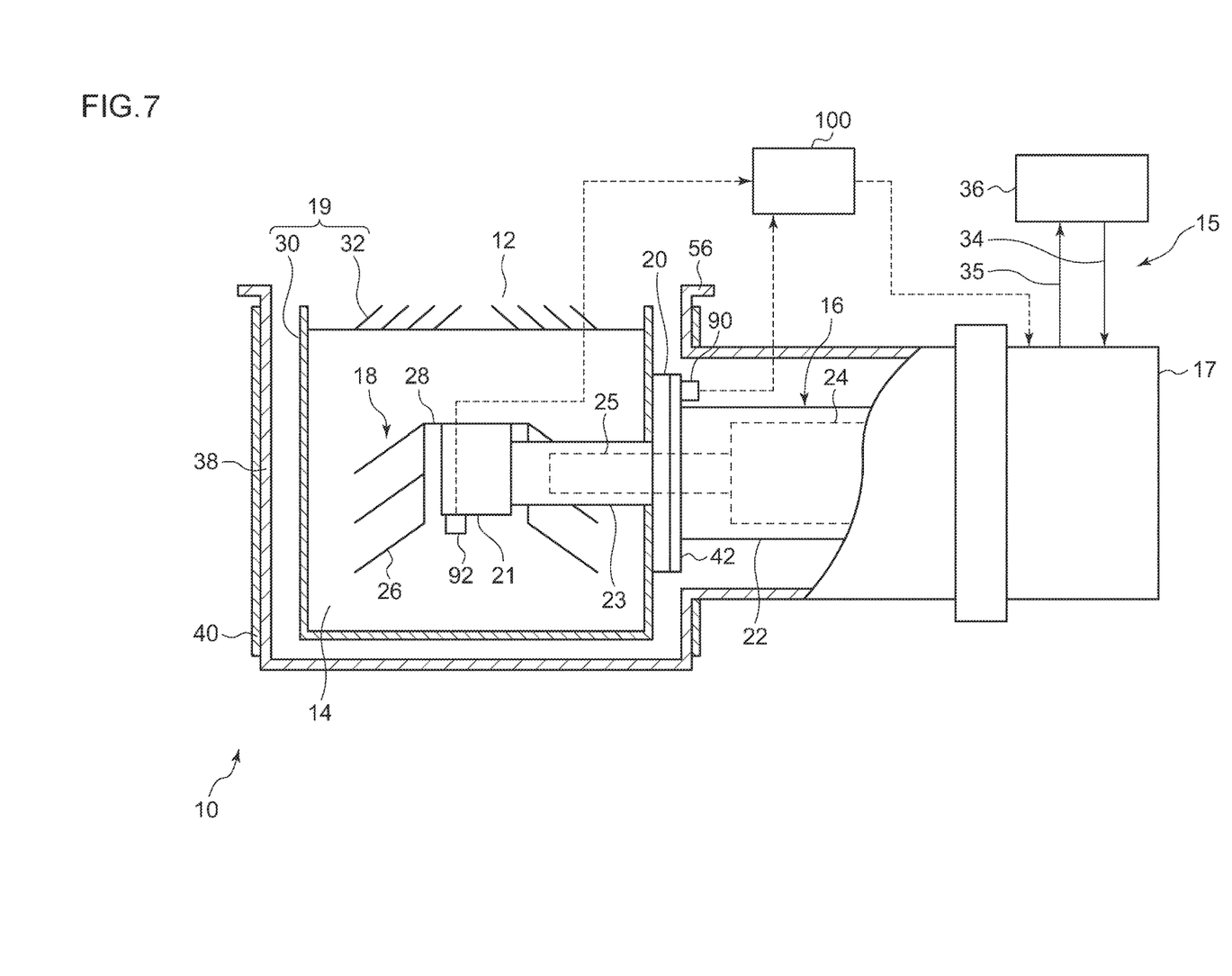
FIG. 7 is a schematic view illustrating a cryopump according to another embodiment of the invention.

FIG. 7 is a schematic view illustrating the cryopump 10 according to another embodiment of the present invention. The cryopump 10 includes a heat load generation element configured to provide a heat load to the high-temperature stage of the refrigerator 16. The control unit 100 operates the heat load generating element such that a heat load is selectively provided to the high-temperature stage of the refrigerator 16 at least temporarily in the cool-down operation. The cooling relief effect is selectively provided to the high-temperature stage of the refrigerator 16 by the heat load generating element. This heat load generating element may be a heating device for heating by radiation or conduction the low-temperature end of the high-temperature stage or an object to be cooled.

The cryopump 10 may include a first heater 40 for heating the housing 38. The first heater 40 provides radiation heat from the housing 38 to the radiation shield 30 by heating the housing 38. Thus, a heat load to the radiation shield 30 can be temporarily increased. The first heater 40 maybe, for example, a band heater covering a surface (e.g., side surface) of the housing 38. Alternatively, the first heater 40 may be configured to spray the external surface of the housing 38 with a high-temperature gas.

The cryopump 10 may include a second heater 42 for heating the first stage 20 and/or the radiation shield 30. The second heater 42 may be mounted directly to the first stage 20 and/or the radiation shield 30. The second heater 42 may be mounted to the first stage 20, for example, outside the radiation shield 30.

The present invention has been described above based on the embodiments. It should be appreciated by those skilled in the art that the invention is not limited to the above embodiments but various design modifications and variations can be made, and such variations are also encompassed by the present invention.

For example, in order to raise the temperature of the operating gas to be supplied, the cooling capability of the heat exchanger 145 may be weakened in the temperature-raising step, instead of the installation of the bypass channel 149 and a switch of the flow channels. For example, the flow rate of a refrigerant (cooling water) in the heat exchanger 145 may be made small, or the temperature of the cooling water may be raised. Alternatively, a refrigerant flow channel in the heat exchanger 145 may be provided with a main flow channel, which exchanges heat with the operating gas, and a bypass channel, which does not exchange heat with the operating gas, such that the flow channels are switched to each other in accordance with the operation state of the refrigerator 16, similarly to the aforementioned embodiments.

In the aforementioned embodiments, the main flow channel 147 and the bypass channel 149 are selectively used to flow the operating gas, but the present invention is not limited thereto. The temperature of the operating gas may be adjusted to some extent by adjusting a ratio of the flow rate of the main flow channel 147 to that of the bypass channel 149.

The cooling system 15 may include a heating element and/or a cooling element, which are used for controlling the temperature of the operating gas, provided with an operating gas circulation circuit (e.g., refrigerator 16, low-pressure conduit 35, compressor 36, or high-pressure conduit 34).

It should be understood that the invention is not limited to the above-described embodiment, but may be modified into various forms on the various forms on the basis of the spirit of the invention. Additionally, the modifications are included in the scope of the invention.

Priority is claimed to Japanese Patent Application No. 2013-28723, filed on Feb. 18, 2013, the entire content of which is incorporated herein by reference.

What is claimed is:

1. A method of operating a cryopump, the cryopump comprising a high-temperature cryopanel, a low-temperature cryopanel, and a refrigerator comprising a high-temperature stage for cooling the high-temperature cryopanel and a low-temperature stage for cooling the low-temperature cryopanel, the method comprising:
controlling a preparatory cool-down operation of the cryopump in which the high-temperature stage and the low-temperature stage are cooled to respective target temperatures before initiating a vacuum pumping operation of the cryopump, wherein an inlet of the cryopump is closed during the preparatory cool-down operation;
determining an operation state of the cryopump;
terminating the preparatory cool-down operation when a high-temperature stage's temperature and a low-temperature stage's temperature reach the high-temperature stage's target temperature and the low-temperature stage's target temperature, respectively; and
opening the inlet of the cryopump to initiate the vacuum pumping operation,
wherein, when the operation state of the cryopump is the preparatory cool-down operation, then a cooling relief effect is provided selectively only to the high-temperature stage within at least part of a period of time before the high-temperature stage's temperature reaches the high-temperature stage's target temperature during the preparatory cool-down operation,
wherein the refrigerator generates a higher refrigeration power in the preparatory cool-down operation than that in the vacuum pumping operation to cool down the high-temperature stage and the low-temperature stage from an environmental temperature rapidly to the respective target temperatures.

2. The method according to claim 1, wherein
if the operation state of the cryopump is the preparatory cool-down operation, then an operating gas, having a temperature higher than that in the vacuum pumping operation, is supplied to the high-temperature stage within at least part of the period of time before the high-temperature stage's temperature reaches the high-temperature stage's target temperature during the preparatory cool-down operation.

3. The method according to claim 2, wherein
the operating gas is supplied from a compressor to the refrigerator,
the compressor is controlled such that, when the operation state of the cryopump is the preparatory cool-down operation, then the operating gas having the higher temperature is supplied to the high-temperature stage within at least part of the period of time before the high-temperature stage's temperature reaches the high-temperature stage's target temperature during the preparatory cool-down operation.

4. The method according to claim 1, further comprising: providing a heat load to the high-temperature stage using a heat load generating element.

5. The method according to claim 4, wherein
the heat load generating element is controlled such that, when the operation state of the cryopump is the preparatory cool-down operation, then the heat load is provided selectively to the high-temperature stage within at least part of the period of time before the high-temperature stage's temperature reaches the high-temperature stage's target temperature during the preparatory cool-down operation.

6. The method according to claim 1, wherein
the preparatory cool-down operation includes an initial cooling phase of the preparatory cool-down operation, the initial cooling phase in which temperatures of the high-temperature stage and the low-temperature stage are lowered toward the respective target temperatures,
if the operation state of the cryopump is the initial cooling phase of the preparatory cool-down operation, then the cooling relief effect is provided selectively to the high-temperature stage within at least part of the period of time before the high-temperature stage's temperature reaches the high-temperature stage's target temperature during the initial cooling phase of the preparatory cool-down operation.

7. The method according to claim 1, wherein
the preparatory cool-down operation includes an initial cooling phase of the preparatory cool-down operation and a temperature adjustment phase of the cool-down operation subsequent to the initial cooling phase of the preparatory cool-down operation, the temperature adjustment phase in which temperatures of the high-temperature stage and the low-temperature stage are adjusted to the respective target temperatures, and when the initial cooling phase is terminated, the low-temperature stage is cooled to a temperature higher than the low-temperature stage's target temperature,
a heat cycle frequency in the refrigerator is controlled so as to cool the high-temperature stage to the high-temperature stage's target temperature in the temperature adjustment phase,
if the operation state of the cryopump is the temperature adjustment phase of the preparatory cool-down operation, then the cooling relief effect is provided selectively to the high-temperature stage at least temporarily during the temperature adjustment phase.

8. A method of operating a cryopump comprising:
closing an inlet of the cryopump;
when the inlet of the cryopump is closed, cooling a cryopanel from an environmental temperature higher than a cryogenic temperature as preparation for a vacuum pumping operation to the cryogenic temperature by using a refrigerator; and
after the cooling, opening the inlet of the cryopump to initiate the vacuum pumping operation, wherein
the cooling includes providing a cooling relief effect selectively only to a high-temperature stage of the refrigerator,
the refrigerator generates a higher refrigeration power in the cooling as preparation than that in the vacuum pumping operation to cool down the cryopanel from the environmental temperature rapidly to the cryogenic temperature.

* * * * *